Patented Jan. 17, 1950

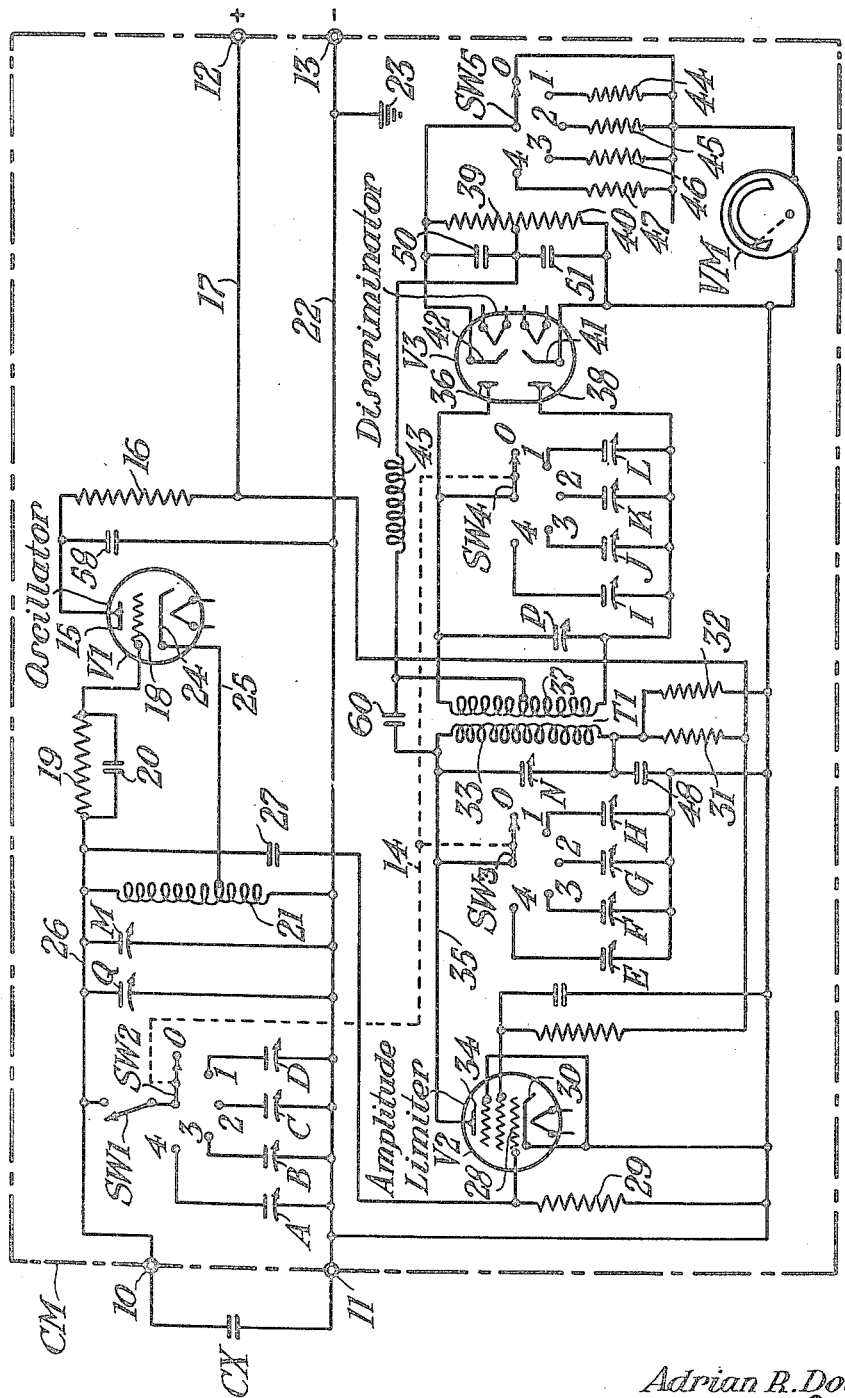

2,494,934

UNITED STATES PATENT OFFICE 2,494,934

DIRECT READING CAPACITY METER

Adrian R. Doucette, Millvale, Pa., assignor to The Union Switch & Signal Company, Swissvale, Pa., a corporation of Pennsylvania Application July 4, 1944, Serial No. 543,499

2 Claims. (Cl. 175—183)

My invention relates to direct reading capacity meters.

A common method of measuring capacities uses a bridge circuit and the unknown capacity is measured by a comparison with a standard. This substitution method presents special problems with small capacities because of the stray capacities of the bridge circuit elements. Also the accuracy depends upon the calibration of the standard and the observer's ability to determine the increment corresponding to the unknown capacity.

Accordingly, a feature of my invention is the provision of a novel and improved direct reading capacity meter.

Another feature of my invention is the provision of an improved direct reading capacity meter for measuring small capacities.

Still another feature of my invention is the provision of a novel capacity meter wherewith the tolerance of manufactured capacitors can be checked.

Other features, objects and advantages involving my invention will appear as the specification progresses.

I obtain the features, objects and advantages embodying my invention by providing an oscillator, an amplitude limiter, a discriminator and a voltmeter. The unknown capacity is connected to the oscillator and the frequency of the oscillations is changed according to the value of the unknown capacity. The oscillator is coupled to the amplitude limiter and any amplitude changes in the output of the oscillator due to varied inductance-capacitance ratio are smoothed out. The amplitude limiter is coupled to the discriminator which converts frequency changes into voltage changes, and the voltmeter is connected to the discriminator to read the voltage changes. The voltmeter scale is calibrated in units of capacitance so that it reads directly the value of the unknown capacity. To read tolerance, a standard capacitor of normal value for the capacitors to be checked is connected to the meter and the meter balanced and the standard capacitor removed. The various capacitors are substituted for the standard, one at a time, and the voltmeter reads the tolerance, that is, it reads the difference between the particular capacitor and the standard.

I shall describe one form of apparatus embodying my invention, and shall then point out the novel features thereof in claims.

The accompanying drawing is a diagrammatic view showing one form of apparatus embodying my invention.

Referring to the drawing, the dot and dash rectangle CM designates a panel or case for mounting the apparatus comprising the meter. This case is provided with terminals for connecting outside devices thereto, four terminals 10, 11, 12 and 13 being shown. The terminals 10 and 11 are used for connecting the capacitor to be measured to the meter and the terminals 12 and 13 are used for connecting a suitable source of power to the meter, such as a battery, the positive and negative terminals of the battery being connected to terminals 12 and 13, respectively, as indicated by a plus and a minus sign. Five switches SW1, SW2, SW3, SW4, and SW5 are provided for manual adjustment of the meter. The switches SW2, SW3, and SW4 are preferably of the gang type and are operatively connected together as indicated by a dotted line 14 for movement of these switches in unison. Each of these three switches has five different positions identified by the numerals 0, 1, 2, 3, and 4. Switch SW5 is also provided with five positions indicated by the numerals 0, 1, 2, 3, and 4, but switch SW1 is a two-position switch having an open and a closed position. It is to be understood that these switches may have more or less positions than those disclosed.

The oscillator of the meter comprises an electron tube V1 and associated circuits. Tube V1 may be of any standard type, and as disclosed it is an indirectly heated triode, the filament of which is heated in the usual manner. An anode 15 of tube V1 is connected to positive power terminal 12 through a resistor 16 and wire 17, and cathode 24 of the tube is connected to negative power terminal 13 through wire 25, intermediate terminal and a portion of an inductance winding 21, and wire 22 to form an anode circuit for the tube. Control grid 18 of tube V1 is connected through a grid leak bias unit consisting of resistor 19 and condenser 20 in multiple, to wire 26 which is connected to terminal 10, and which wire serves as one bus wire for an oscillating circuit including inductance winding 21 and a plurality of capacitors to be referred to shortly. Wire 22, which is connected to the negative power terminal 13 is also connected to terminal 11 and to a ground terminal 23, and this wire serves as another bus wire for the oscillating circuit and as a ground connection for other circuits of the meter to be described hereinafter. Two capacitors Q and M, at least one of which is preferably adjustable, are included in the oscillating or tank circuit by being permanently connected across bus wires 22 and 26 in multiple with inductance winding 21. Four other capacitors A, B, C, and D are connected to bus wires 22 and 26 through switches SW1 and SW2 to be included in the oscillating circuit, the arrangement being such that when switch SW1 is closed capacitor A, B, C, or D is included in the oscillating circuit according as switch SW2 is set at its 4, 3, 2, or 1 position. Each of these capacitors A, B, C, and D is preferably adjustable. Any unknown capacitor, such as a capacitor CX is included in the oscillating circuit by being connected to terminals 10 and 11 of the meter. A by-pass condenser 58 is connected across the anode 15 of tube V1 and the grounded bus wire 22.

It is clear that with switch SW1 open and no capacitor CX connected across terminals 10 and 11, the frequency of the current supplied by the oscillator is preselected by the position of the capacitors Q and M, but that with switch SW1 closed and capacitors Q and M set at given positions and no unknown capacitor connected to terminals 10 and 11, the frequency of the current supplied by the oscillator can be preselected within limits according to the setting of switch SW2. That is, there are five different ranges of frequencies available, namely, a first range is established when switch SW2 is set at position 0 and capacitors Q and M only are included in the oscillating circuit, a second range is established when switch SW2 is set at position 1 and adjustable capacitor D is added to the oscillating circuit, a third range is established when switch SW2 is set at position 2 and adjustable capacitor C is added to the oscillating circuit, a fourth range when the switch SW2 is set at position 3 and adjustable capacitor B is included in the oscillating circuit, and a fifth range is provided when the switch is set at position 4 and adjustable capacitor A is included in the oscillating circuit. Furthermore, with any given position of switch SW2 and an unknown capacitor CX connected to terminals 10 and 11, the frequency of the oscillations supplied by the oscillator is changed according to the value of the unknown capacitor. The oscillations created by the oscillator are applied to an amplitude limiter through a connection including the condenser 27 as will appear shortly.

The amplitude limiter comprises an electron tube V2 and associated circuits. As here shown, tube V2 is an indirectly heated pentode, the filament of the tube being heated in the usual conventional manner. Tube V2 is provided with a control grid circuit including control grid 28, resistor 29, ground wire 22 and cathode 30, and this control grid circuit is connected to the oscillator through the connection including condenser 27, as explained hereinbefore. Power is supplied to anode 34 of tube V2 through a voltage divider consisting of resistors 31 and 32 connected across the power terminals 12 and 13 through wires 17 and 22. The junction terminal of these two resistors is connected to anode 34 through primary winding 33 of a coupling transformer T1 and wire 35.

To tune the anode circuits of tube V2 to resonance at the frequency of the oscillator, a group of capacitors E, F, G, H, and N are provided, each of which capacitors is preferably adjustable. Capacitor N is connected permanently across primary winding 33 of transformer T1 and each of the capacitors E, F, G, and H is connected across winding 33 through another capacitor 48 according to position 4, 3, 2, or 1 of switch SW3. The parts of the amplitude limiter are proportioned for the tube V2 to function as a class C amplifier and thus with the anode circuit tuned to resonance at the frequency of the oscillations of the oscillator an electromotive force having a frequency corresponding to the frequency of the oscillations of the oscillator is induced in secondary winding 37 of coupling transformer T1 and the amplitude of such oscillations induced in secondary winding 37 is substantially constant over a relatively wide variation in amplitude of the oscillations supplied by the oscillator.

The discriminator includes a double diode tube V3, the filaments of which are heated in the usual manner. Anode 36 of one section of tube V3 is connected to the top outside terminal as viewed in the drawing of secondary winding 37 of coupling transformer T1, and anode 38 of the other section of tube V3 is connected to the lower outside terminal of secondary winding 37. Resistors 39 and 40 in series are connected across cathodes 41 and 42 of the two sections of tube V3 and the junction terminal of resistors 39 and 40 is connected to midterminal of secondary winding 37 of transformer T1 through a coil 43. Also, a condenser 60 is connected between primary winding 33 of transformer T1 and the midterminal of secondary winding 37, and condensers 50 and 51 are connected across resistors 39 and 40, respectively. The outside terminal of resistor 40 is connected to ground bus wire 22.

Tuning of the discriminator to the frequency ranges of the oscillator is effected through capacitors I, J, K, L, and P. Capacitor P is permanently connected across secondary winding 37, and capacitors I, J, K, and L are connected across winding 37, through positions 4, 3, 2, and 1, respectively, of switch SW4. Each of these capacitors is preferably adjustable.

Frequency changes appearing in the electromotive force induced in secondary winding 37 of transformer T1 are converted into voltage changes across resistors 39 and 40 in the well-known manner.

A voltmeter VM of any suitable form is connected across resistors 39 and 40 by having one terminal connected to the ground bus wire 22 and its other terminal connected to top terminal of resistor 39 through switch SW5. At position 0 of switch SW5, the voltmeter is connected directly to the resistor 39 and at the other positions 1, 2, 3, and 4 of the switch the resistors 44, 45, 46, and 47, respectively, are included in the connection and serve as a multiplier of the voltmeter. Furthermore, voltmeter VM is preferably provided with different scales, each of which would be calibrated to read corresponding units of capacitance. By way of illustration it may be said that the voltmeter VM has one scale calibrated to read from 0 to 125 micromicrofarads, a second scale to read from 0 to 350 micromicrofarads, a third scale to read 0 to 1250 micromicrofarads, a fourth scale to read from 0 to 3500 micromicrofarads, and a fifth scale to read between 0 and some still higher value of capacitance. Furthermore, each of these scales would be multiplied as to the value of the capacitance through the different positions of the switch SW5, each position of the switch and the respective resistor interposed in the connection thereby serving as a multiplier of the reading of the voltmeter. In this way the voltmeter VM is provided with a scale that corresponds to each frequency range of the oscillator as provided through the different positions of the switch SW2.

The capacity meter is prepared to measure capacitance of its lowest range by setting the switches SW2, SW3, SW4, and SW5 in their 0 positions, switch SW1 being closed. With no unknown capacitor CX connected to terminals 10 and 11, the capacitor Q is set at its minimum range and capacitor M is set at about the center of its range. With this setting for the oscillator, the oscillator supplies a given frequency of oscillation such as, for example, 300 kilocycles per second. The capacitors N and P are adjusted for maximum reading of the voltmeter VM and capacitor P is readjusted for 0 reading of the voltmeter. That is to say, the discriminator is tuned to resonance at the frequency of the oscillations supplied by the oscillator, and no voltage is created across resistors 39 and 40. Capacitor CX to be measured is next connected to the terminals 10 and 11 and this capacitor CS causes a change in the frequency of the oscillations supplied by the oscillator in direct proportion to the value of the capacitor CX. Any variation in the amplitude of the oscillations is smoothed out at the amplitude limiter and oscillations of a corresponding frequency are induced in secondary winding 37 of transformer T1 and this change in the frequency of the oscillations is converted to a corresponding voltage drop across resistors 39 and 40, the voltage drop being directly proportioned to the change in the frequency. This voltage drop created across resistors 39 and 40 is indicated on the scale of the voltmeter VM and, as explained hereinbefore, the scale is calibrated to read in units of capacitance. Thus the capacitance of the capacitor CX is read directly on the voltmeter. Assuming that the scales of the voltmeter are calibrated in the manner explained hereinbefore, any capacitor up to 125 micromicrofarads can be measured by this first range of the meter. To increase the range and still use the same scale of the voltmeter, the switch SW5 can be set at its different positions 1, 2, 3, and 4 and the scale reading of the voltmeter multiplied by a value predetermined by the value of resistors 44, 45, 46, and 47.

To use the next range of the meter, the switches SW2, SW3, and SW4 are set in position 1. Capacitor D is now set at substantially the center of its range and capacitors H and L are adjusted first for maximum reading of voltmeter VM and capacitor L readjusted to cause the voltmeter to read zero. The unknown capacitor CX is now connected to terminals 10 and 11 and the value of the capacity is read on the second scale of voltmeter VM, which second scale, by way of illustration, has been assumed to be calibrated to read from 0 to 350 micromicrofarads, when the switch SW5 is set at position 0. The reading of this scale can be multiplied by different predetermined amounts by setting switch SW5 at one of its different positions.

Similarly, the meter can be used to measure capacitance of still higher values by setting switches SW2, SW3, and SW4 at their other positions 2, 3, and 4. In each case the meter would be first adjusted in the manner explained hereinbefore and then the capacitor to be measured would be connected to the terminals 10 and 11 and the value of such capacitor would be read directly on the scale of the voltmeter VM.

To measure tolerance, that is, an allowed amount of variation from a standard, the meter is set at its lowest range, and a standard capacitor of a nominal value for the capacitors to be checked is connected to the terminals 10 and 11. Capacitor N is adjusted for maximum indication on the voltmeter, with capacitor P out of balance. Capacitor P is then adjusted for 0 reading of the voltmeter, which in this case would preferably be one having a 0 center scale. The standard capacitor is then removed and the capacitors to be measured for tolerance are connected one at a time to the terminals 10 and 11. The variation of each capacitor from the standard can be read directly on the scale of the voltmeter.

The meter CM can be used also to measure capacitance by the substitution method. Under such circumstances, the capacitors A, B, C, and D would each be of a standard capacitance. In the case the second range is to be used, the capacitors H and L would be adjusted in the manner explained hereinbefore for 0 reading of the voltmeter. Capacitor D is then removed by opening the switch SW1 and the unknown capacitor CX is connected to terminals 10 and 11. The difference between the capacitor CX and the standard D is read on the voltmeter and in that manner the total value of the capacitance of capacitor CX is determined. In the other positions of the switches, the capacitors C, B, and A would be first used and then disconnected from the circuit by the opening of the switch SW1 and the capacitor to be measured connected to terminals 10 and 11 and its capacitance determined by the reading of the voltmeter plus the value of the standard capacitor.

A meter such as here disclosed has the advantages that capacitance can be read directly, a relatively wide range of values measured for the various ranges of the meter, extremely small capacitance can be measured and errors due to stray capacitance between circuit elements avoided. Also the meter has the further advantages that one side of the test circuit is at ground potential due to the use of a ground bus wire 22 and therefore shielded lead wires can be extended from terminals 10 and 11 to the capacitor under test and the capacity of such lead wires neutralized through the setting of the capacitors Q and M.

It is to be understood that the meter is not limited to the values and ranges of capacitance used in the description and such values and ranges are for illustration.

Although I have herein shown and described but one form of direct reading capacity meters embodying my invention, it is understood that various changes and modifications may be made therein within the scope of the appended claims without departing from the spirit and scope of my invention.

Having thus described my invention, what I claim is:

1. In a capacity meter in which the frequency of the oscillations supplied by an oscillator is changed from an initial frequency according to a capacitor to be measured; an electron tube having an anode, a cathode and a control grid; a transformer having a first and a second winding, an anode circuit including said first winding and a voltage source connected across said anode and cathode, a grid circuit including a resistor connected across said grid and cathode and adapted to receive oscillations, said resistor and voltage source proportioned for limiting the amplifications of said electron tube, a discriminator including two diodes each having an anode and a cathode, said discriminator provided with an input circuit which connects said second winding across said anodes of said diodes and with an output circuit which includes a pair of resistors in series connected across the cathodes of said diodes, a first switching means including a multiple position switch and a plurality of adjustable capacitors one for each position of the switch, said first switching means connected across said first winding to tune it to resonance at any selected frequency of a plurality of different frequency ranges, a second switching means including a multiple position switch and a plurality of adjustable capacitors one for each position of the switch, said second switching means connected across said second winding to tune it to resonance at any selected frequency of a plurality of different frequency ranges, a meter, a third switching means including a multiple position switch and a plurality of resistors and operable to connect any one of its resistors in series with said meter for adjusting the meter to indicate a plurality of different ranges of voltages, and said meter connected across said pair of resistors through said third switching means to indicate a variation in the frequency of the oscillations applied to said grid of the electron tube from any selected frequency of any one of the plurality of said frequency ranges.

2. In a capacity meter in which the frequency of the oscillations supplied by an oscillator is made to vary with respect to an initial frequency according as a capacitor to be measured varies from a given standard capacitor; an electron tube having an anode, a cathode and a control grid; a transformer having a first and a second winding, an anode circuit including said first winding and a voltage source connected across said anode and cathode, a grid circuit including a resistor connected across said grid and cathode and adapted to receive oscillations, said resistor and voltage source proportioned to limit the amplification of said tube, a discriminator including two diodes each having an anode and a cathode, said discriminator provided with an input circuit which connects said second winding across the anodes of said diodes and with an output circuit which includes a pair of resistors in series connected across the cathodes of said diodes, a first switching means including a multiple position switch and adjustable capacitors one for each position of the switch, said first switching means connected across said first winding to tune it to resonance at any selected frequency of a plurality of different frequency ranges according to the position of the switch and the setting of the respective adjustable capacitor, a second switching means including a multiple position switch and adjustable capacitors one for each position of the switch, said second switching means connected across said second winding to tune it to resonance at any selected frequency of a plurality of different frequency ranges according to the position of the switch and the setting of the respective adjustable capacitor, said first and second switching means effective by the setting of their switches and capacitors to cause said discriminator to develop zero voltage across said pair of resistors when oscillations of any selected frequency of said plurality of different frequency ranges are applied to said grid, a voltmeter having a zero center scale, a third switching means including a multiple position switch and resistors one for each position of the switch and operable to connect any one of its resistors in series with said voltmeter to adjust the voltmeter to a plurality of different voltage ranges, and said voltmeter connected across said pair of resistors through said third switching means, whereby the variation of the frequency of the oscillations applied to said grid to either side of said selected frequency is indicated by the reading of the voltmeter.

ADRIAN R. DOUCETTE.

REFERENCES CITED

The following references are of record in the file of this patent:

UNITED STATES PATENTS

| Number | Name | Date |
|---|---|---|
| 1,571,278 | Kuhn | Feb. 2, 1926 |
| 1,663,086 | Long | Mar. 20, 1938 |
| 1,917,237 | Barbulesco et al. | July 11, 1933 |
| 2,065,652 | Carlson | Dec. 29, 1936 |
| 2,146,073 | Jennens et al. | Feb. 7, 1939 |
| 2,209,959 | Chittick et al. | Aug. 6, 1940 |
| 2,218,642 | Hathaway | Oct. 22, 1940 |
| 2,228,367 | Sanders, Jr. | Jan. 14, 1941 |
| 2,273,110 | Kimball et al. | Feb. 17, 1942 |
| 2,280,678 | Waymouth | Apr. 21, 1942 |
| 2,307,316 | Wolff | Jan. 5, 1943 |
| 2,337,328 | Hathaway | Dec. 21, 1943 |
| 2,362,503 | Scott | Nov. 14, 1944 |